US007626722B2

(12) United States Patent
Niito

(10) Patent No.: US 7,626,722 B2
(45) Date of Patent: Dec. 1, 2009

(54) IMAGE RECORDING APPARATUS

(75) Inventor: Yoshiharu Niito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1128 days.

(21) Appl. No.: 10/462,662

(22) Filed: Jun. 17, 2003

(65) Prior Publication Data

US 2004/0070663 A1 Apr. 15, 2004

(30) Foreign Application Priority Data

Jun. 17, 2002 (JP) ............................ 2002-176152

(51) Int. Cl.
*G06F 15/00* (2006.01)
*B41J 2/44* (2006.01)

(52) U.S. Cl. ....................................... 358/1.7; 358/474

(58) Field of Classification Search .................. 358/1.1, 358/1.4, 1.7, 1.8, 448, 474, 497, 486, 505; 347/129, 130, 233, 236
See application file for complete search history.

(56) References Cited

U.S. PATENT DOCUMENTS

| | | | | |
|---|---|---|---|---|
| 4,423,426 | A | 12/1983 | Kitamura | 358/410 |
| 4,977,414 | A | 12/1990 | Shimada et al. | |
| 5,019,913 | A | 5/1991 | Kiya et al. | |
| 5,035,198 | A | 7/1991 | Niito | |
| 5,107,278 | A | 4/1992 | Shimada et al. | |
| 5,786,594 | A | 7/1998 | Ito et al. | 358/474 |
| 6,147,776 | A | 11/2000 | Sakurai et al. | |
| 6,483,529 | B1 * | 11/2002 | Ito et al. | 347/235 |
| 6,603,116 | B2 | 8/2003 | Niito | |
| 6,836,278 | B2 | 12/2004 | Saito et al. | 347/237 |
| 2002/0135822 | A1 * | 9/2002 | Morita et al. | 358/505 |

FOREIGN PATENT DOCUMENTS

| | | |
|---|---|---|
| JP | 56-9763 | 1/1981 |
| JP | 05-344292 | 12/1993 |
| JP | 10-90616 | 4/1998 |
| JP | 2001-228417 | 8/2001 |
| JP | 2001-264657 | 9/2001 |

OTHER PUBLICATIONS

U.S. Appl. No. 10/059,238, filed Jan. 31, 2002, Ono.
U.S. Appl. No. 10/462,662, filed Jun. 17, 2003, Niito.

* cited by examiner

*Primary Examiner*—Gabriel I Garcia
(74) *Attorney, Agent, or Firm*—Oblon, Spivak, McClelland, Maier & Neustadt, P.C.

(57) ABSTRACT

There is provided an image recording apparatus able to form images without fluctuation of image dot intervals in the main scan direction.

The image recording apparatus comprises a light emitting source including multiple light emitting units emitting laser beams, and a detection unit for detecting the laser beams and measuring intervals of the laser beams in the main scan direction. Based on the measured intervals of the laser beams in the main scan direction, light emission timings of the light emitting units are adjusted so that the intervals between each two image dots on the photoconductor in the main scan direction are not influenced by the interval fluctuation of the laser emitting units.

5 Claims, 12 Drawing Sheets

IMAGE RECORDING APPARATUS

BACKGROUND OF THE INVENTION

1. Field of the Invention

The present invention relates to a scanning optical system using a laser diode array, and an image recording apparatus including the scanning optical system.

2. Description of the Related Art

In an image recording apparatus including a scanning optical system, such as a laser printer, or a copier machine, high speeds of image formation and high image densities are desirable. It is known that this can be achieved by using a scanning optical system including a plurality of laser beams to scan the surface of a photoconductor medium at the same time, and, laser diode arrays are widely used in the scanning optical system to emit the laser beams.

When using the laser diode arrays, in order that the scanning optical system forms scanning lines on the surface of the photoconductor medium having constant intervals, the laser diodes in a laser diode array, or a laser driving unit in which the laser diode array is installed, are arranged to be inclined relative to the main scan direction.

However, the laser diodes are usually inclined in different ways, and furthermore in different laser driving units, and even in the same laser diode array, the intervals between two laser diodes are not constant. Consequently, the laser diodes in a scanning optical system have different intervals in the main scan direction.

In the related art, in order to reduce the interval fluctuation in each laser driving unit, when mounting the laser driving unit to an image recording apparatus, it is required to adjust the light emission timings of the laser diodes of the laser diode array according to the interval differences of the laser diodes. Further, when the laser driving unit is changed in repairing an image recording apparatus of a user, additional interval fluctuation of the laser diodes may occur, and this causes degradation of the image quality.

SUMMARY OF THE INVENTION

Accordingly, it is a general object of the present invention to solve the above problem of the related art.

A specific object of the present invention is to provide an image recording apparatus able to form images without fluctuation of image dot intervals in a main scan direction.

To attain the above objects, according to a first aspect of the present invention, there is provided an image recording apparatus, comprising light emitting means for emitting a plurality of laser beams, rotating deflection means for deflecting the laser beams to scan in a main scan direction while rotating, a scanning surface irradiated by the laser beams deflected by the rotating deflection means, each beam forming an image dot on the scanning surface, and detection means for detecting the laser beams and measuring intervals of the laser beams in the main scan direction, wherein emission times of the laser beams are adjusted in response to the measured intervals.

Preferably, the emission timings of the laser beams are adjusted in response to the measured intervals so that a change of an interval between two of the image dots on the scanning surface in the main scan direction produced by differences of the intervals between each two adjacent laser beams is zero.

According to the above aspect of the present invention, detection means are provided to measure the intervals of laser beams in the main scan direction, and from the measured intervals, the emission timings of the laser beams are adjusted to eliminate the influence of the fluctuation of interval of the laser beams on the intervals of the image dots in the main scan direction during scanning. As a result, it is possible to form images without fluctuation of image dot intervals in the main scan direction. In addition, the adjustment procedure in fabrication of the image recording apparatus can be omitted.

To attain the above objects, according to a second aspect of the present invention, there is provided an image recording apparatus comprising a light emitting source including a plurality of light emitting units that emit a plurality of laser beams, a rotating deflector that deflects the laser beams to scan in a main scan direction while rotating, a photoconductor having a scanning surface irradiated by the laser beams deflected by the rotating deflection means, each beam forming an image dot on the scanning surface, and a detection unit arranged to detect the laser beams and measure the intervals of the laser beams in the main scan direction, wherein light emission timings of the light emitting units are adjusted in response to the measured intervals.

Preferably, light emission timings of the light emitting units are adjusted in response to the measured intervals so that a change of an interval between two of the image dots on the scanning surface in the main scan direction produced by differences of the intervals between each two adjacent laser beams is zero.

Preferably, the detection unit may be arranged between the rotating deflector and the photoconductor. Alternatively, the detection unit may be arranged to be in proximity of the photoconductor along the main scan direction.

According to the above aspect of the present invention, it is possible to realize an image recording apparatus that forms images without fluctuation of image dot intervals in the main scan direction. In addition, the adjustment procedure in fabrication of the image recording apparatus can be omitted.

In addition, when arranging the detection unit near the photoconductor along the main scanning direction, for example, at a position before a starting scanning position, it is possible to correct the image dot intervals in the main scan direction on the scanning surface, enabling formation of images without fluctuation of image dot intervals in the main scan direction. Furthermore, when arranging the detection unit near the photoconductor along the main scanning direction at a position after the ending scanning position, it is possible to correct fluctuation of the image dot intervals in the main scan direction caused by the previous components, for example, the rotating deflector, or associated circuits, enabling formation of images without fluctuation of image dot intervals in the main scan direction.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention will be explained with reference to the accompanying drawings.

In the following descriptions, as an example, explanations are made of an image recording apparatus having a scanning optical system including a laser diode array consisting of four laser beams.

First Embodiment

Figure 1:
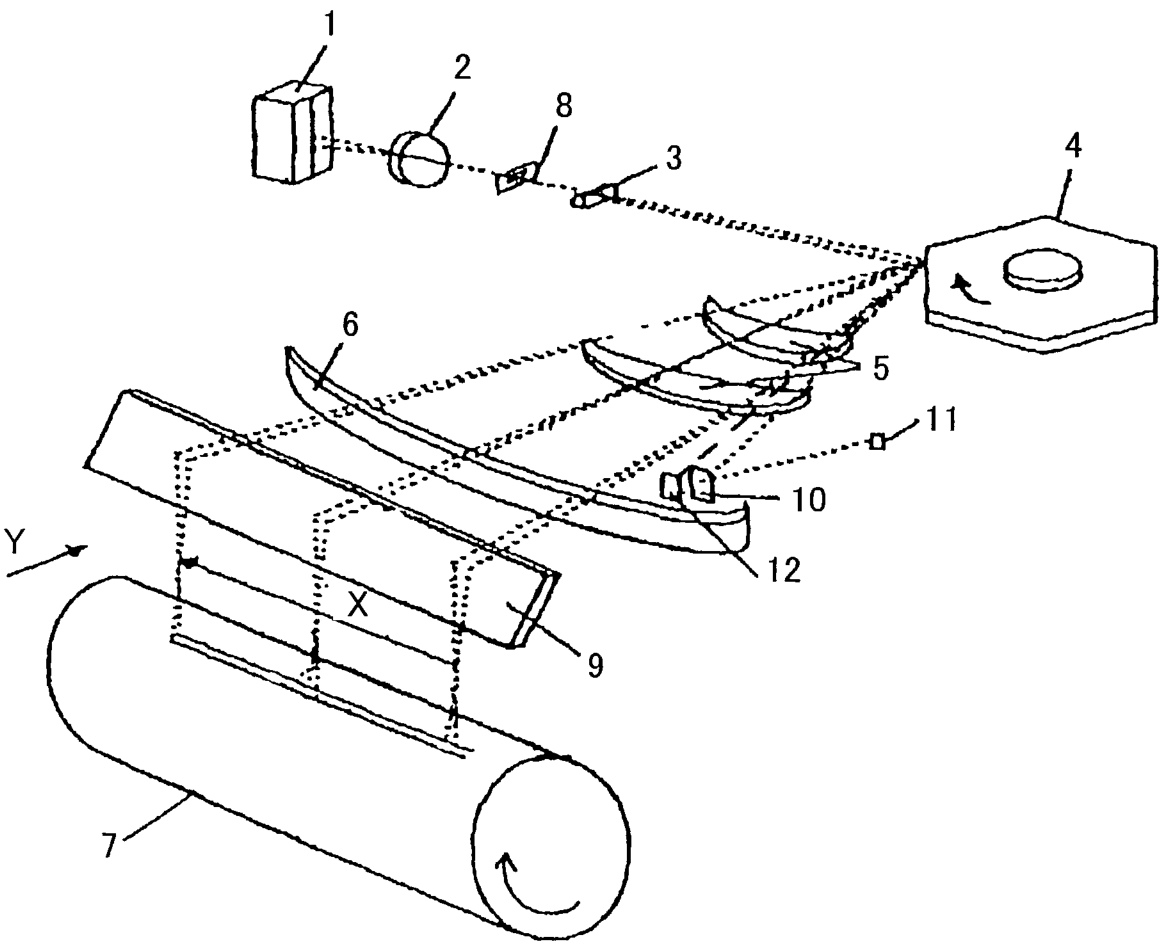
FIG. 1 is a perspective view for schematically showing a configuration of a scanning optical system of an image recording apparatus according to a first embodiment of the present invention.

FIG. 1 is a perspective view of a scanning optical system of an image recording apparatus according to a first embodiment of the present invention.

The scanning optical system shown in FIG. 1 includes a laser diode array 1, a collimator lens 2, an aperture 8, a cylindrical lens 3, a rotating polygon deflector 4, a pair of fθ lenses 5, a long sheet lens 6, a reflective mirror 9, and a photoconductor drum 7. Further, the scanning optical system has a synchronization detection system including a synchronization detection sensor 10, an image data controller 11, and a CCD area sensor 12.

In the scanning optical system shown in FIG. 1, the laser diode array 1 includes four light emitting units packed in one chip to emit four laser beams. For example, the laser diode array 1 is a semiconductor laser chip having four laser units and emits four divergent laser beams.

The light emitting units are individually controllable when being modulated, and are arranged at approximately the same position in the main scan direction, and separated by certain distances in the sub scan direction, which is the rotation direction of the photoconductor drum 7. The four light emitting units emit four laser beams modulated according to the corresponding image data.

The collimator lens 2 condenses the divergent laser beams from the light emitting units, and converts the divergent laser beams into parallel beams.

The aperture 8 and the cylindrical lens 3 shape the laser beams condensed by the collimator lens 2. The combination of the aperture 8 and the cylindrical lens 3 is refractive in the sub-scanning direction; it focuses the laser beams from the collimator lens 2 and forms approximately line-shaped images on (or near) one of the reflection and deflection surfaces of the rotating polygon deflector 4. In detail, the aperture 8 has a slit that cuts excessive laser beams according to the desired writing density. The cylindrical lens 3 focuses the laser beams to their corresponding specified sizes on (or near) one of the reflection and deflection surfaces of the rotating polygon deflector 4 in order for scanning the photoconductor drum 7 in the main scan direction.

The rotating polygon deflector 4 is driven to rotate at a constant regular speed, and reflects and deflects the laser beams incident on one of its reflection and deflection surfaces in the direction to the reflective mirror 9.

The fθ lens 5 and the long sheet lens 6 are arranged between the rotating polygon deflector 4 and the photoconductor drum 7 to make corrections for the laser beams.

The fθ lenses 5 convert the movement of the laser beams induced by the constant angular speed rotation of the rotating polygon deflector 4 to motion at a constant linear speed along the main scan direction.

The long sheet lens 6 performs the face tangle error correction for the laser beams. In detail, the long sheet lens 6 corrects the face tangle error of the laser beams caused by the inclination of the deflection and reflection surfaces of the rotating polygon deflector 4 relative to its rotation axis to suppress the thus induced fluctuation of scanning line intervals in the sub scan direction.

The reflective mirror 9 reflects the laser beams corrected by the long sheet lens 6 to the photoconductor drum 7, forming laser beam spots of certain sizes on the scanning surface of the photoconductor drum 7, and further forming image dots on the scanning surface.

Due to the rotation of the rotating polygon deflector 4, the laser beams scan the photoconductor drum 7, that is, the beam spots move on the scanning surface of the photoconductor drum 7 in the main-scanning direction X, the axial direction of the photoconductor drum 7, drawing four lines of an image each time at certain intervals in the sub scan direction Y, the rotation direction of the photoconductor drum 7.

In FIG. 1, as described above, the synchronization detection sensor 10, the image data controller 11, and the CCD area sensor 12 form a system for synchronization detection.

The synchronization detection sensor 10 is arranged near the long sheet lens 6 in the plane formed by the scanning laser beams along the main scan direction, and is set before a starting position of the scanning lines, that is, the synchronization detection sensor 10 is outside of the angular region in the main scan direction of the effective image recording region on the scanning surface of the photoconductor drum 7. Due to this arrangement, the synchronization detection sensor 10 detects the laser beams right before they start to scan the photoconductor drum 7 in the main scan direction, and thus obtains the scanning starting time, and then outputs a scanning starting signal (referred to as "synchronization detection signal", and represented by DETP below). This signal is used to correct and determine the recording position in the main scan direction.

The CCD area sensor 12, for example, is also arranged in the plane formed by the scanning laser beams along the main scan direction before the starting position of the scanning lines, but at a position inside the synchronization detection sensor 10 in the main scan direction. In contrast to the synchronization detection sensor 10 that measures the scanning timing, the CCD area sensor 12 measures the positions of the incident laser beams to determine the intervals of laser beams from the laser diodes of the laser diode array 1 in the main scan direction.

Figure 5:
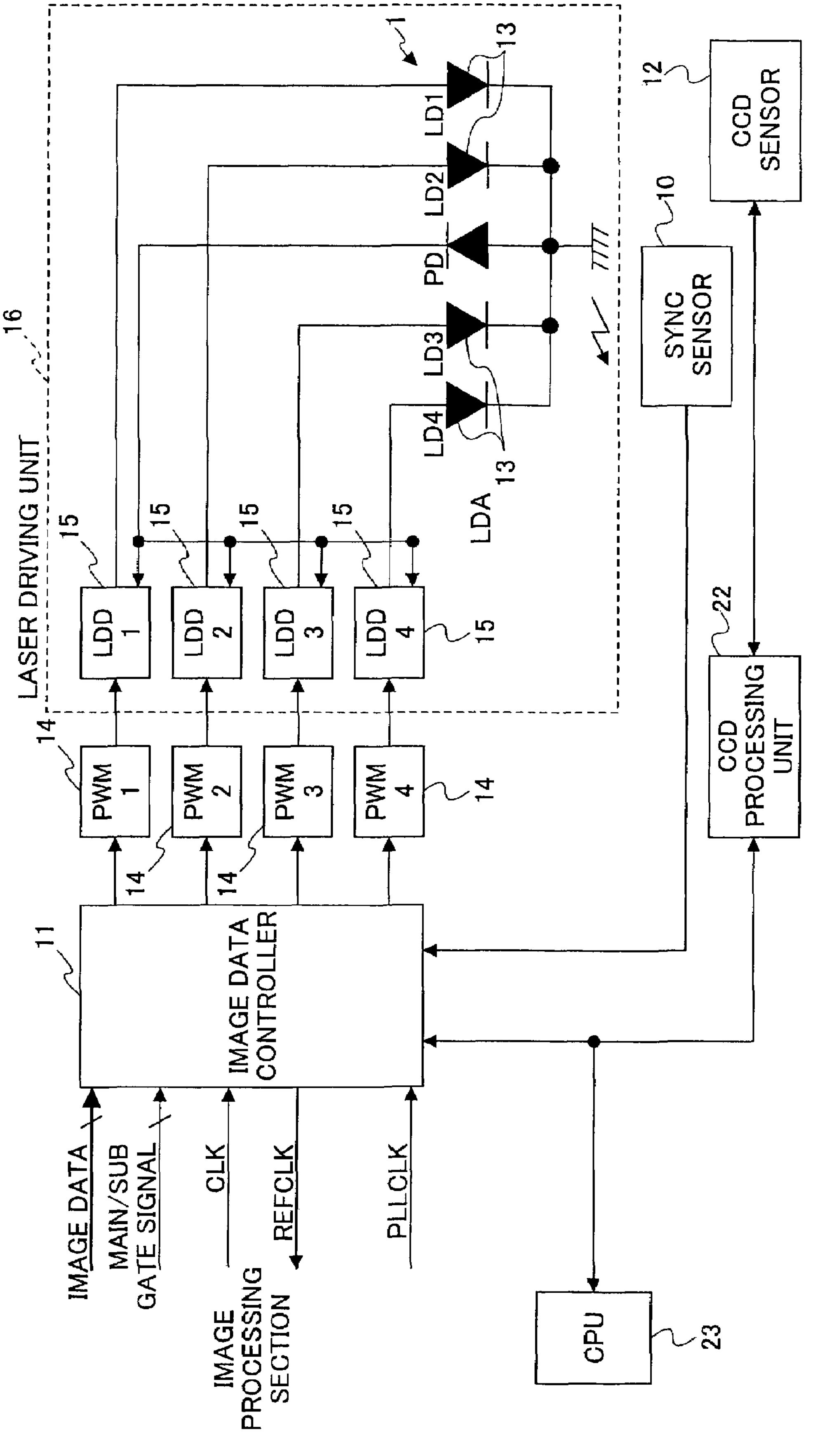
FIG. 5 is a block diagram showing a configuration of a control section of the laser diode array 1 of the image recording apparatus according to the first embodiment of the present invention.

The interval data measured by the CCD area sensor 12 are sent to the image data controller 11 via a CCD processing unit 22 shown in FIG. 5. From the measured interval data, the image data controller 11 determines the correct recording positions of the laser beams in the main scan direction.

Figure 2:
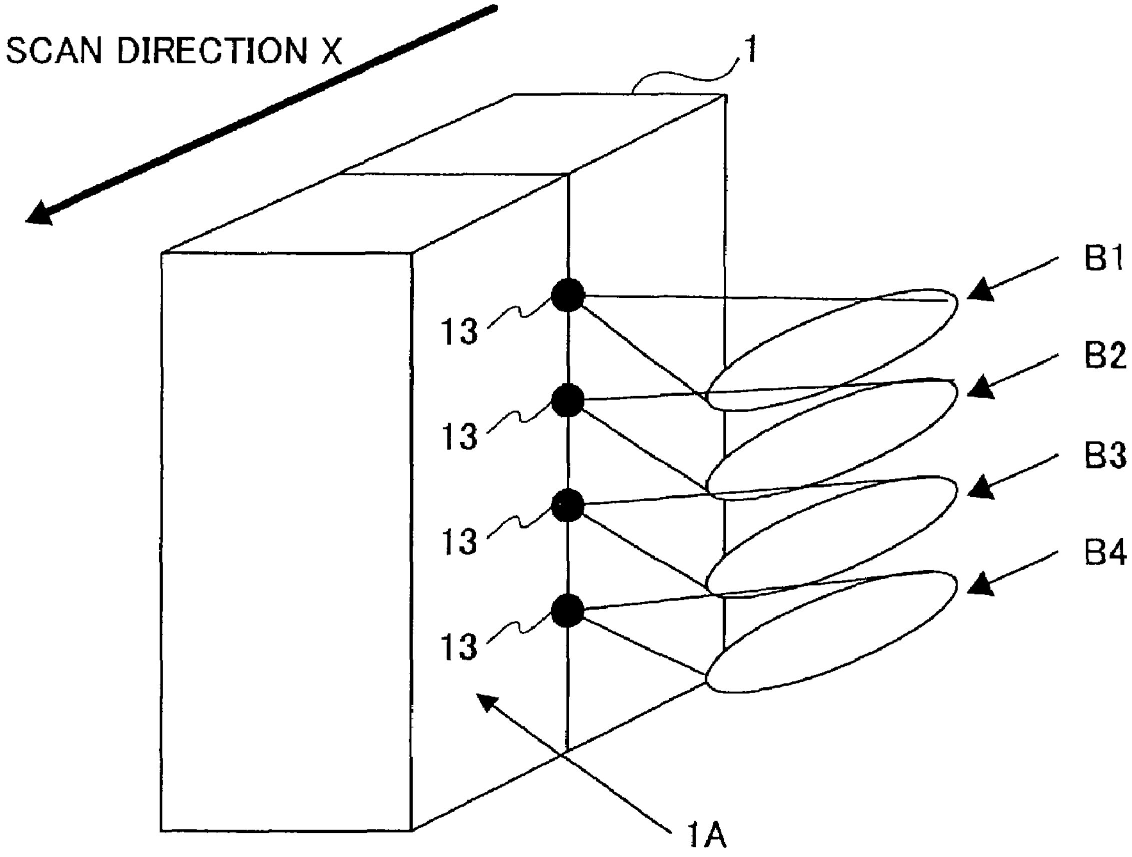
FIG. 2 is an enlarged view of the laser diode array chip 1 in the scanning optical system of the image recording apparatus according to the first embodiment of the present invention.

FIG. 2 is an enlarged view of the laser diode array chip 1 in the scanning optical system of the image recording apparatus described above. As illustrated in FIG. 2, four light emitting units 13 are arranged along a line on the surface 1A of the laser diode array chip 1, and they emit laser beams B1, B2, B3, B4, respectively.

Figure 3:
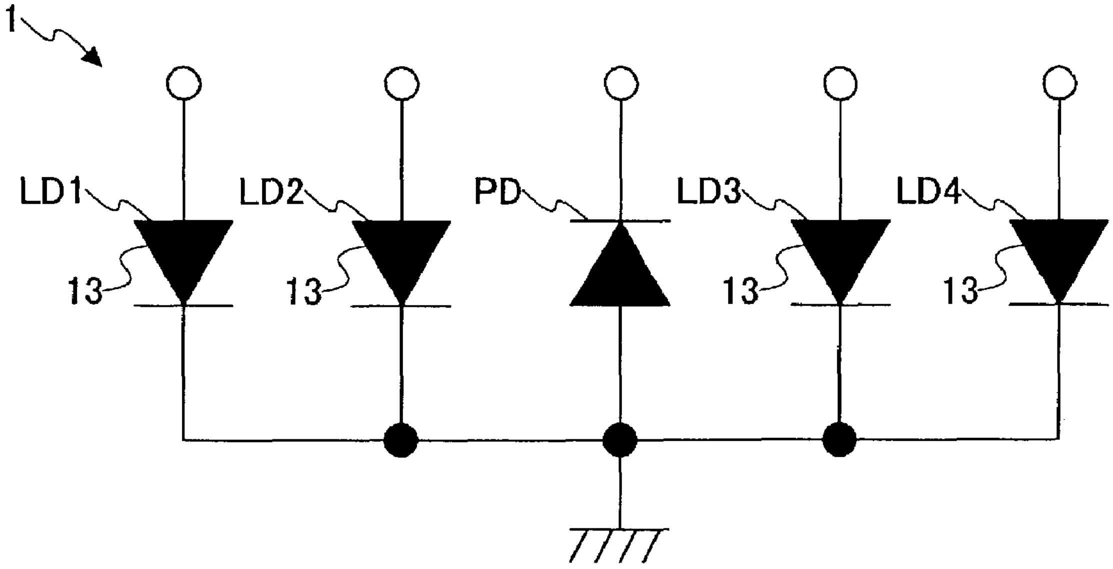
FIG. 3 is a view showing a configuration of the laser diode array 1 in the scanning optical system of the image recording apparatus according to the first embodiment of the present invention.

FIG. 3 shows a configuration of the laser diode array 1. As illustrated in FIG. 3, the laser diode array 1 has four laser diodes (denoted as LD1, LD2, LD3, and LD4, respectively) corresponding to the four light emitting units 13, and a photo diode PD for detecting the density of the laser beams from the laser diodes LD1, LD2, LD3, and LD4, respectively. Here, the laser diodes LD1, LD2, LD3, and LD4 are referred to as CH 1, CH 2, CH 3, and CH 4 of the laser diode array 1.

Figure 4:
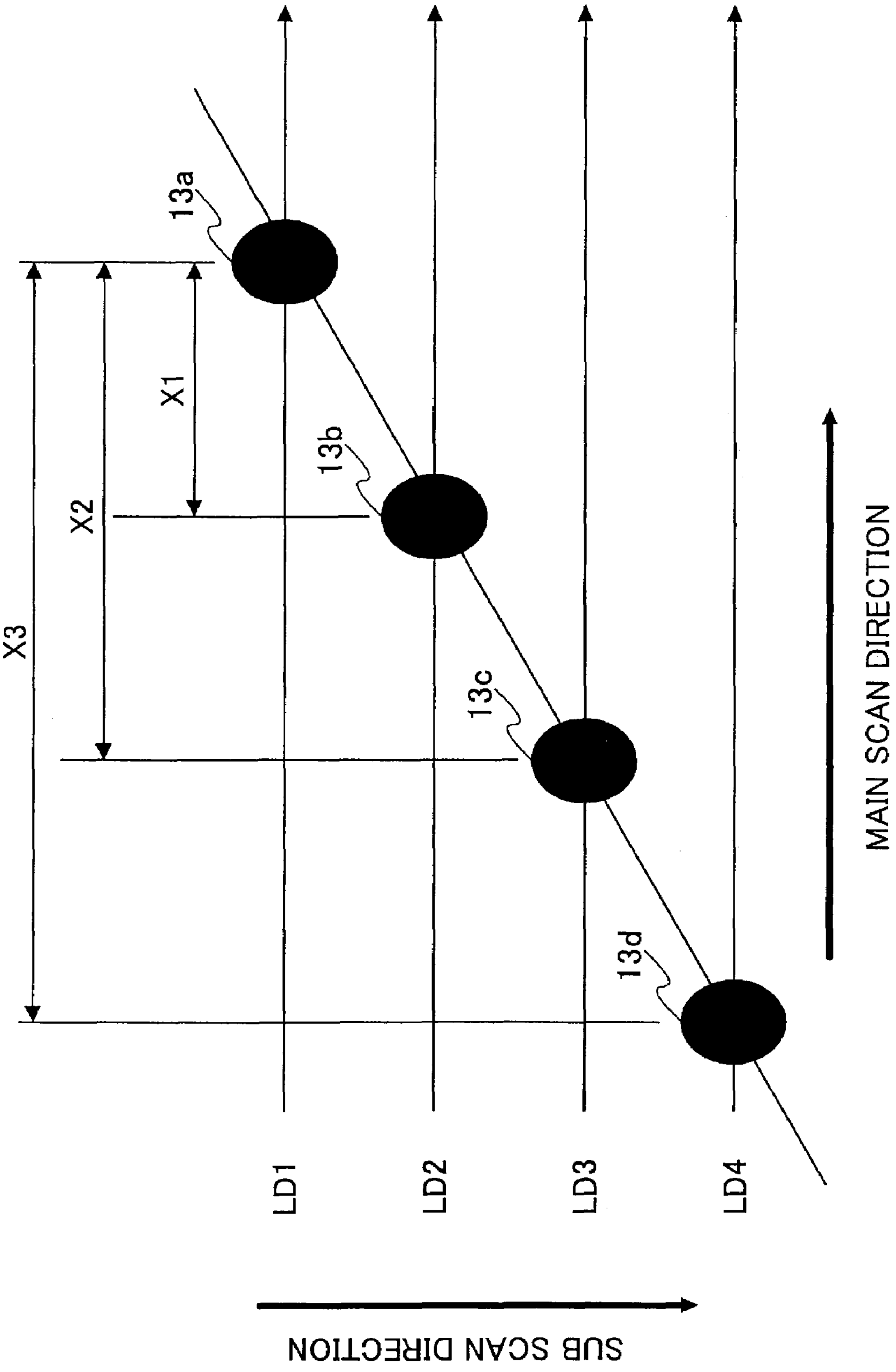
FIG. 4 is a view for explaining the position relation of image dots on the scanning surface of the photoconductor drum 7.

FIG. 4 shows the position relation of image dots on the scanning surface of the photoconductor drum 7. In FIG. 4, laser beams from the laser diodes LD1, LD2, LD3, and LD4 scan in order in the main scan direction, and in the sub scan direction as well, and the beam from the laser diode LD1 scans a leading position. Further, it is assumed that synchronization detection sensor 10 only detects the laser beam from the laser diode LD1 to determine the scanning starting time, and the distances from the image dot 13*a* of the CH 1 to the image dots 13*b*, 13*c*, and 13*d* of the CH2, CH3, CH4 are X1, X2, and X3, respectively.

FIG. 5 is a block diagram showing a configuration of a control section of the laser diode array 1. As illustrated in FIG. 5, image data equaling to four lines of an image are input sequentially to the image data controller 11 from a not-shown image data processing section according to the synchronization detection signal, which is used to determine the recording position in the main scan direction. In the image data controller 11, the image data equaling to four lines are stored in a not-shown line memory, and the timing of the image data corresponding to each line is adjusted to match the rotating timing of the rotating polygon deflector 4, and then the image-data equaling to four lines are output to four pulse width modulation circuits 14 (abbreviated as PWM1, PWM2, PWM3, and PWM4) at the same time.

Each of the four pulse width modulation circuits 14 generates a modulated signal by means of pulse width modulation according to the input image data, and the modulated signals are input to laser diode drivers 15 (abbreviated as LDD1, LDD2, LDD3, and LDD4) of a laser driving section 16. The laser diode drivers LDD1, LDD2, LDD3, and LDD4 drive the laser diodes LD1, LD2, LD3, and LD4, respectively, according to the corresponding modulated signal.

In addition, the image data controller 11 generates a reference signal (REFCLK) for transferring image data to the not-shown image processing section, while image data controller 11 transfers image data to the pulse width modulation circuits 14 using as a reference the synchronization detection signal from the synchronization detection sensor 10.

In the laser driving section 16, which includes the laser diode drivers 15 and the laser diodes 13 of the laser diode array 1, there is arranged a not-shown memory to store measured data of the intervals X1, X2, and X3, as illustrated in FIG. 4.

More specifically, before the laser driving section 16 is mounted to an image recording apparatus, the intervals of image dots in the sub scan direction are first adjusted in a procedure for adjusting the laser driving unit 16; then measurement is made to obtain the intervals X1, X2, and X3, and these interval data are stored in the memory mentioned above.

After the laser driving section 16 is mounted to an image recording apparatus, the CPU 23 of the image recording apparatus reads out the interval data in the main scan direction stored in the laser driving section 16, and based on these data, the CPU 23 determines and sets the light emission time delays of the laser diodes LD1, LD2, LD3, and LD4 of the laser diode array 1.

As shown in FIG. 5, the position data measured by the CCD area sensor 12 are first input to a CCD signal processing unit 22, which reduces the measured data; then the CCD signal processing unit 22 sends the interval data to the image data controller 11.

Below, with reference to FIG. 6 through FIG. 11, explanations are made of the method of correcting the light emission timing of the laser diodes LD1, LD2, LD3, and LD4 of the laser diode array 1 so as to correct the interval differences of the laser diodes LD1, LD2, LD3, and LD4.

Figure 6:
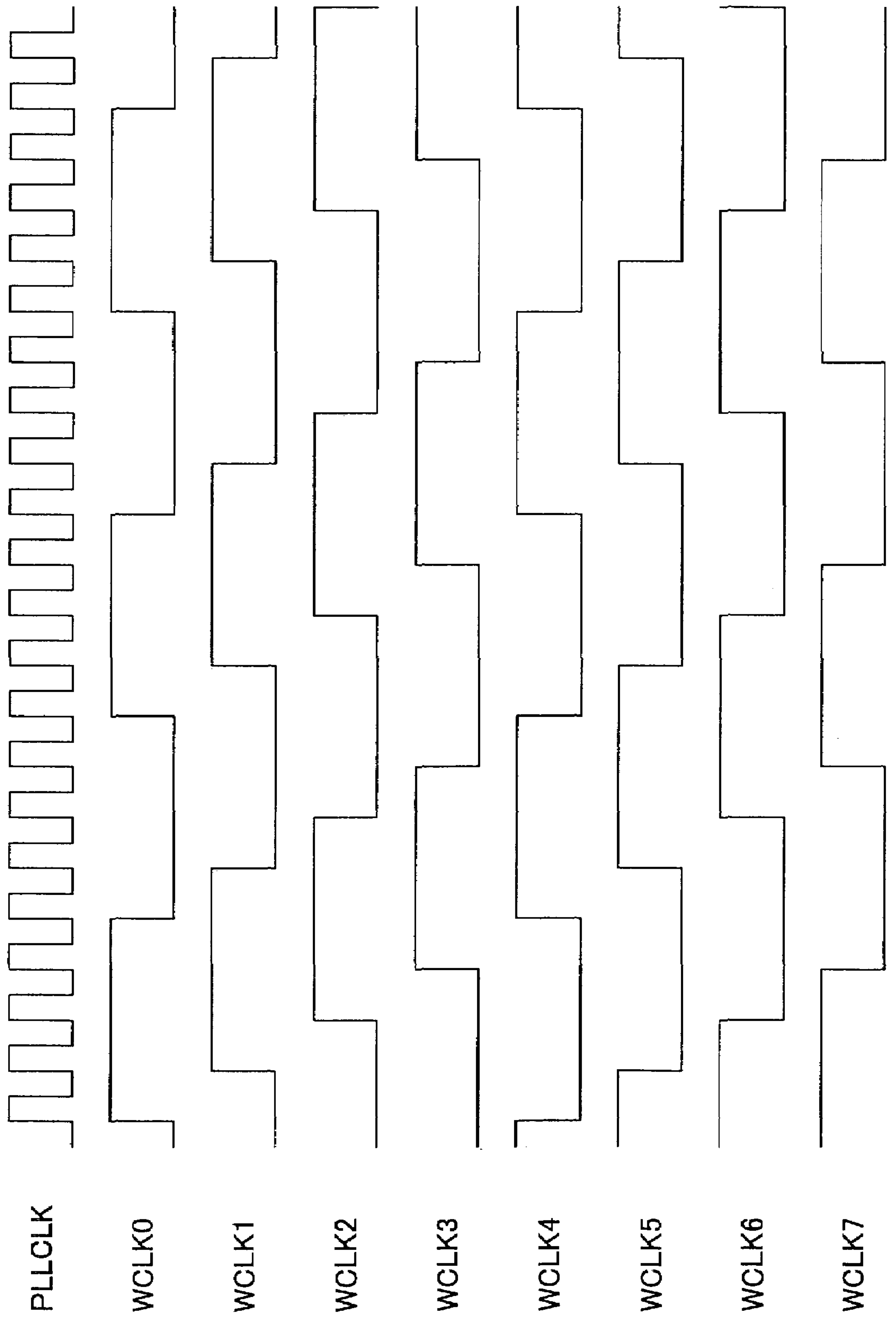
FIG. 6 is a timing chart showing the timing relation of the PLL oscillation clock PLLCLK and the write clocks WCLK0 through WCLK7 in the image recording apparatus according to the first embodiment of the present invention.

FIG. 6 is a timing chart showing the timing relation of the PLL oscillation clock PLLCLK generated in the image data controller 11 and the write clocks WCLK0 through WCLK7 (or pixel clock), as described below, appropriate four clocks of the write clocks WCLK0 through WCLK7 are selected to drive the laser diodes LD1 through LD4 to emit laser beams so as to write on the scanning surface of the photoconductor drum 7.

Here, as an example, the frequencies of the write clocks WCLK0 through WCLK7 are one-eighth of the frequency of the PLL oscillation clock PLLCLK. As illustrated in FIG. 6, the write clock WCLK0 is in synchronization with the PLL oscillation clock PLLCLK, but the write clocks WCLK1 through WCLK7 are delayed relative to the PLL oscillation clock PLLCLK by one through seven clock pulses, respectively. As described below, according to the desired light emission time delays of the laser diodes, appropriate four write clocks are selected from the write clocks WCLK0 through WCLK7 (or pixel clock) to drive light emission of the corresponding laser diode.

Figure 7:
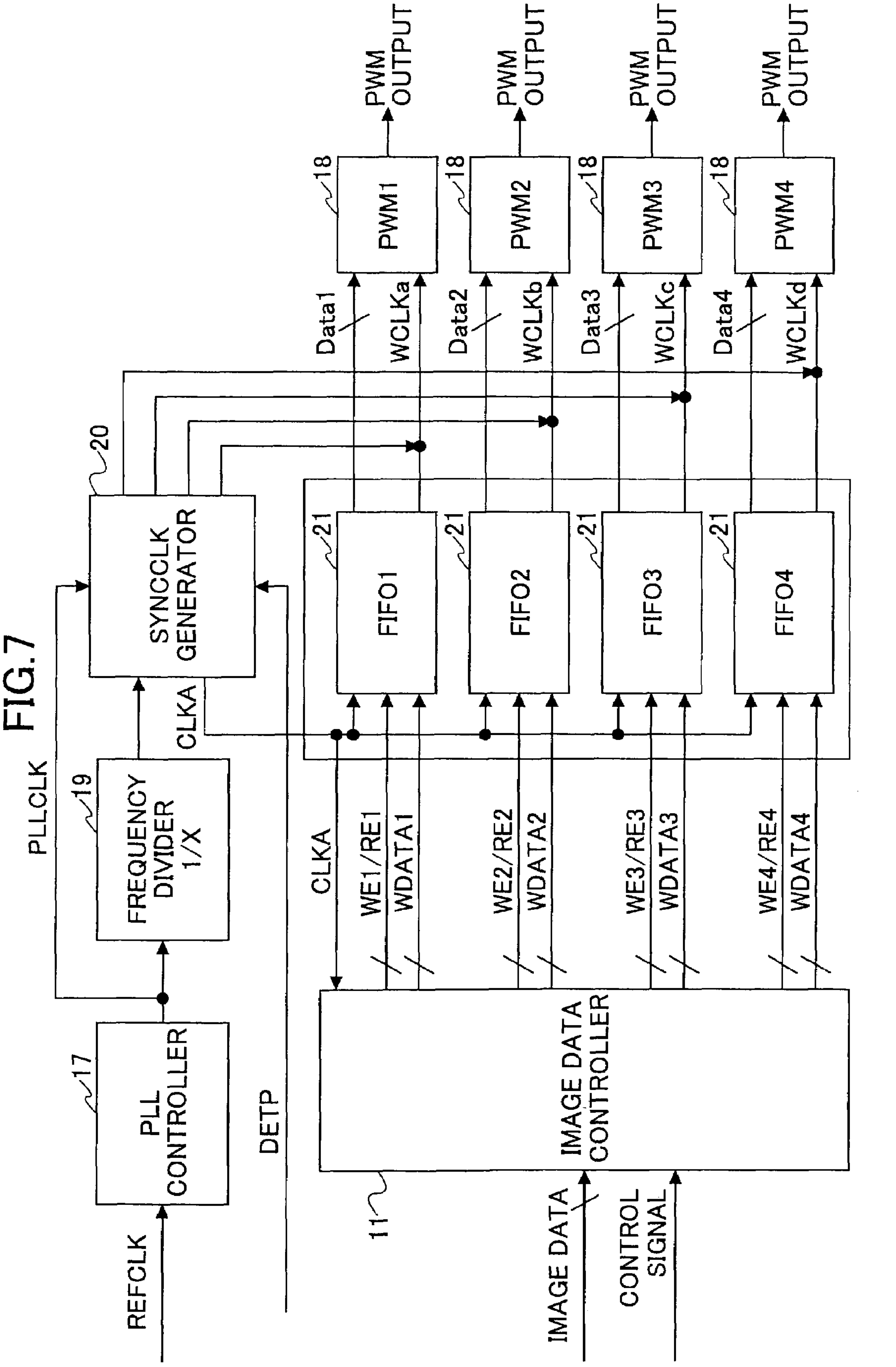
FIG. 7 is a block diagram showing configurations of a PLL controller 17 and a PWM control circuit 18 in the image recording apparatus according to the first embodiment of the present invention.

FIG. 7 is a block diagram showing configurations of a PLL controller 17 and a PWM control circuit 18.

The PLL reference clock REFCLK is input to the PLL controller 17. In the PLL controller 17, the frequency of the PLL reference clock REFCLK is multiplied by a not-shown VCO (Voltage Controlled Oscillator) and is output as the PLL oscillation clock PLLCLK to a frequency divider 19 and a synchronization clock generator 20.

The frequency divider 19 divides the frequency of the PLL oscillation clock PLLCLK by X, and outputs the frequency-divided PLL oscillation clock PLLCLK to the synchronization clock generator 20.

The synchronization clock generator 20 generates the write clocks WCLK0 through WCLK7. In the synchronization clock generator 20, the write clocks WCLK1 through WCLK7 are delayed relative to the input PLL oscillation clock PLLCLK by one through seven clock pulses, respectively. With reference to the synchronization detection signal DEPT, one of the write clocks WCLK1 through WCLK7 is selected as clock CLKA and is input to the image data controller 11 and the FIFO 1 through 4 of the FIFO section 21. In addition, according to the desired light emission time delay of the laser diodes LD1 through LD4 in the main scan direction, appropriate write clocks WCLKa, WCLKb, WCLKc, and WCLKd are selected from the clocks WCLK1 through WCLK7 to drive the pulse width modulating circuit 1 through 4 of the PWM control circuit 18, respectively.

The image data and the signals for controlling the main scanning and sub scanning are input to the image data controller 11. In the image data controller 11, the image data are divided into four portions of WDATA1, WDATA2, WDATA3, and WDATA4 related to the laser diodes LD1 through LD4, respectively, and are input to the subsequent FIFO 1 through FIFO 4 of the FIFO section 21.

The operation of writing the image data WDATA1, WDATA2, WDATA3, and WDATA4 from the image data controller 11 to the FIFO 1 through FIFO 4 is controlled by the write enable signals WE1 through WE4, respectively, and the clock signal CLKA. In addition, the operation of reading the image data from the FIFO 1 through FIFO 4 to the pulse width modulating circuit 1 through 4 of the PWM control circuit 18 is controlled by the read enable signals RE1 through RE4 and the write clocks WCLKa, WCLKb, WCLKc, and WCLKd selected with the clock CLKA as a reference.

Therefore, from the difference between the write enable signal WE and the read enable signal RE, it is possible to set the delay in units of pixels, and further, by selecting the write clocks WCLKa, WCLKb, WCLKc, and WCLKd, it is possible to set the delay in units of ⅛ pixel.

Figure 8:
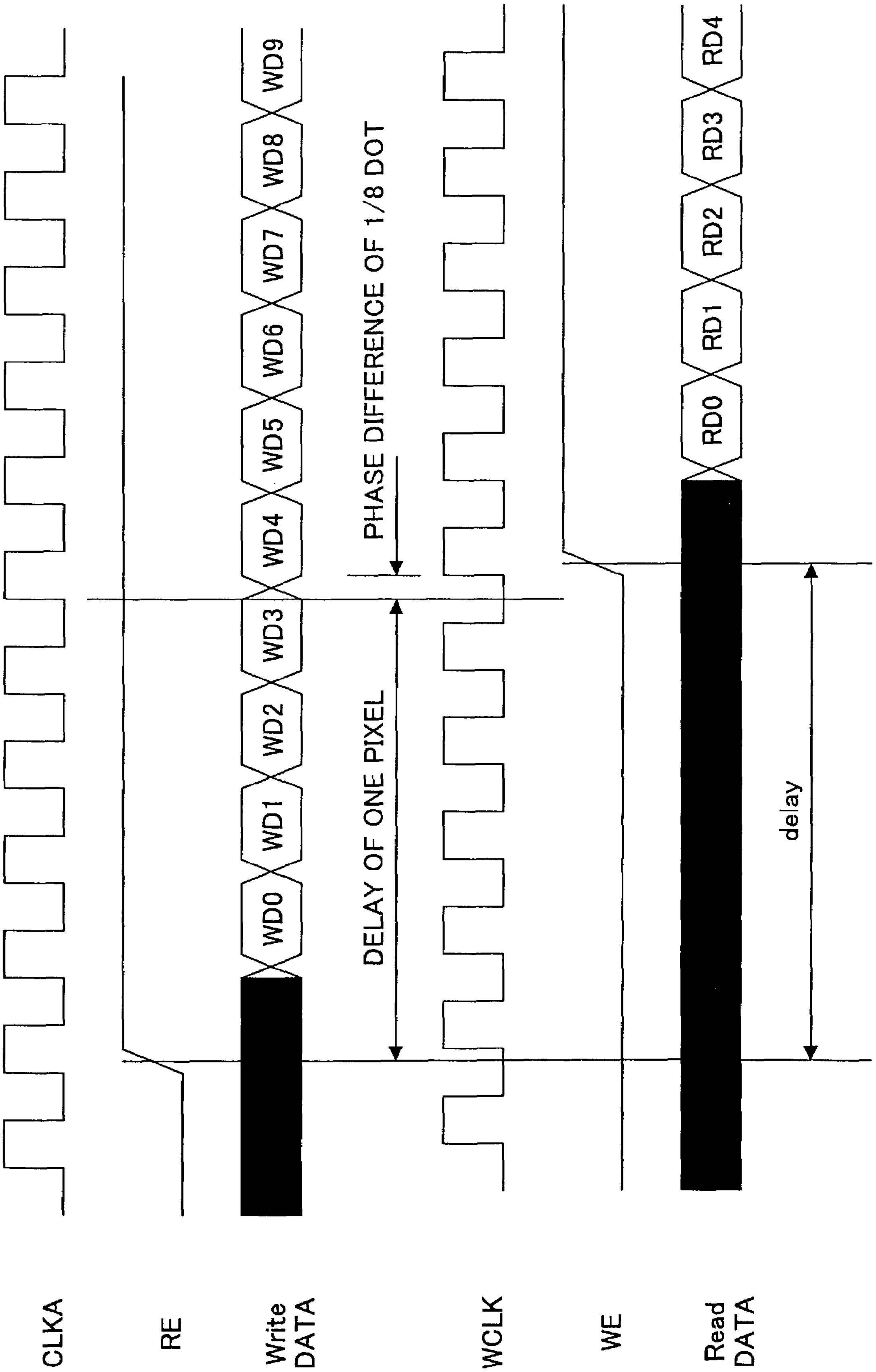
FIG. 8 is a timing chart showing the operation of the FIFO section 21 of the image recording apparatus according to the first embodiment of the present invention.

FIG. 8 is a timing chart showing the operation of the FIFO section 21, illustrating the above description.

Figure 9:
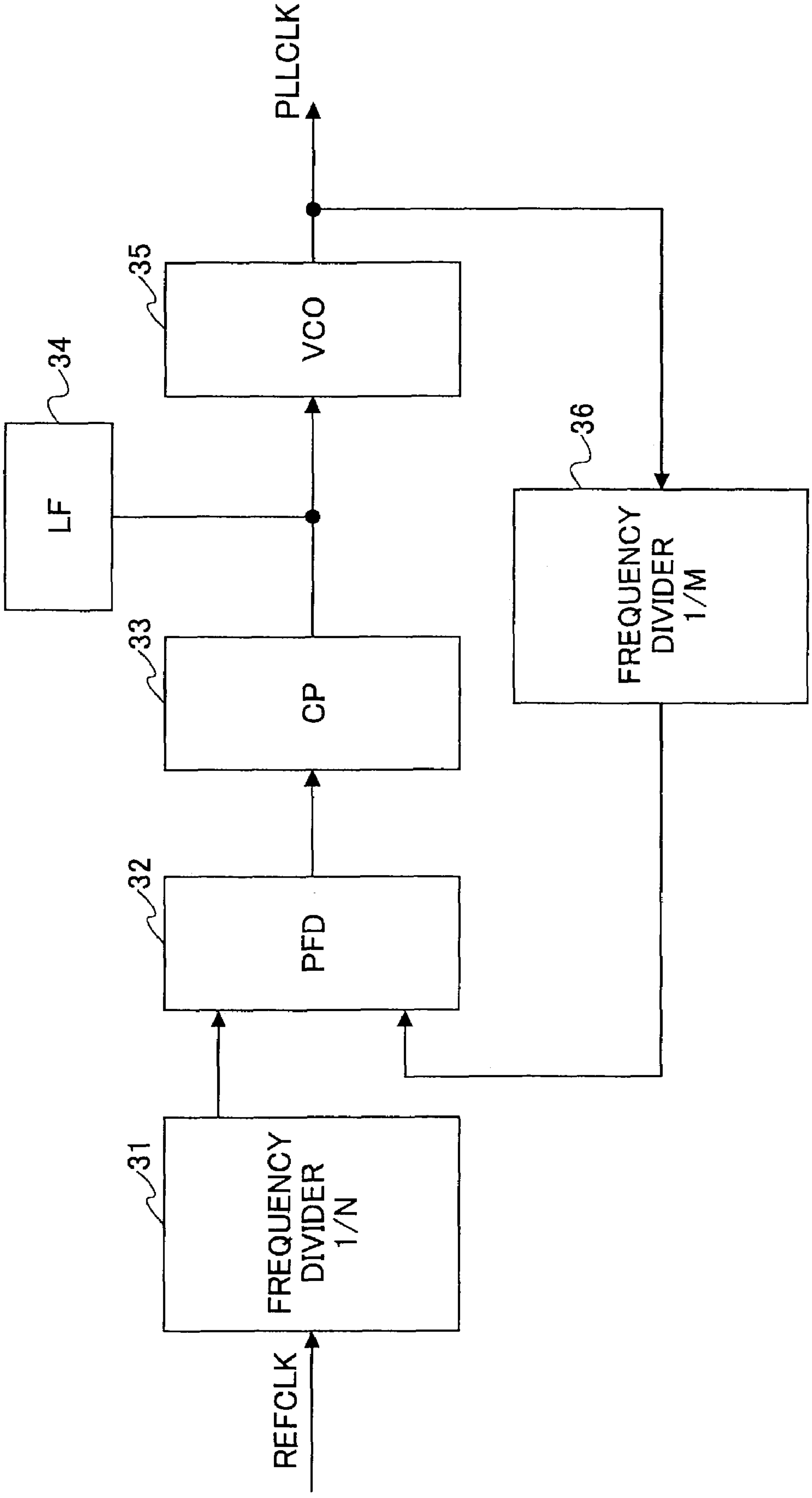
FIG. 9 is a block diagram showing a configuration of the PLL controller 17 of the image recording apparatus according to the first embodiment of the present invention.

FIG. 9 is a block diagram showing a configuration of the PLL controller 17. As illustrated in FIG. 9, in the PLL controller 17, the reference clock REFCLK is input to a frequency divider 31, where the frequency of the reference clock REFCLK is divided by N. This frequency-divided reference clock REFCLK is input to a phase frequency detector (PFD) 32, where the frequency-divided reference clock REFCLK is compared with the PLL oscillation clock PLLCLK input from a frequency divider 36 of a frequency division ratio of M. The charge pump (CP) 33 converts the phase difference of the two clocks into an analog signal and outputs the signal to the VCO 35. The VCO 35 oscillates according to the analog signal, and generates the PLL oscillation clock PLLCLK.

Figure 10:
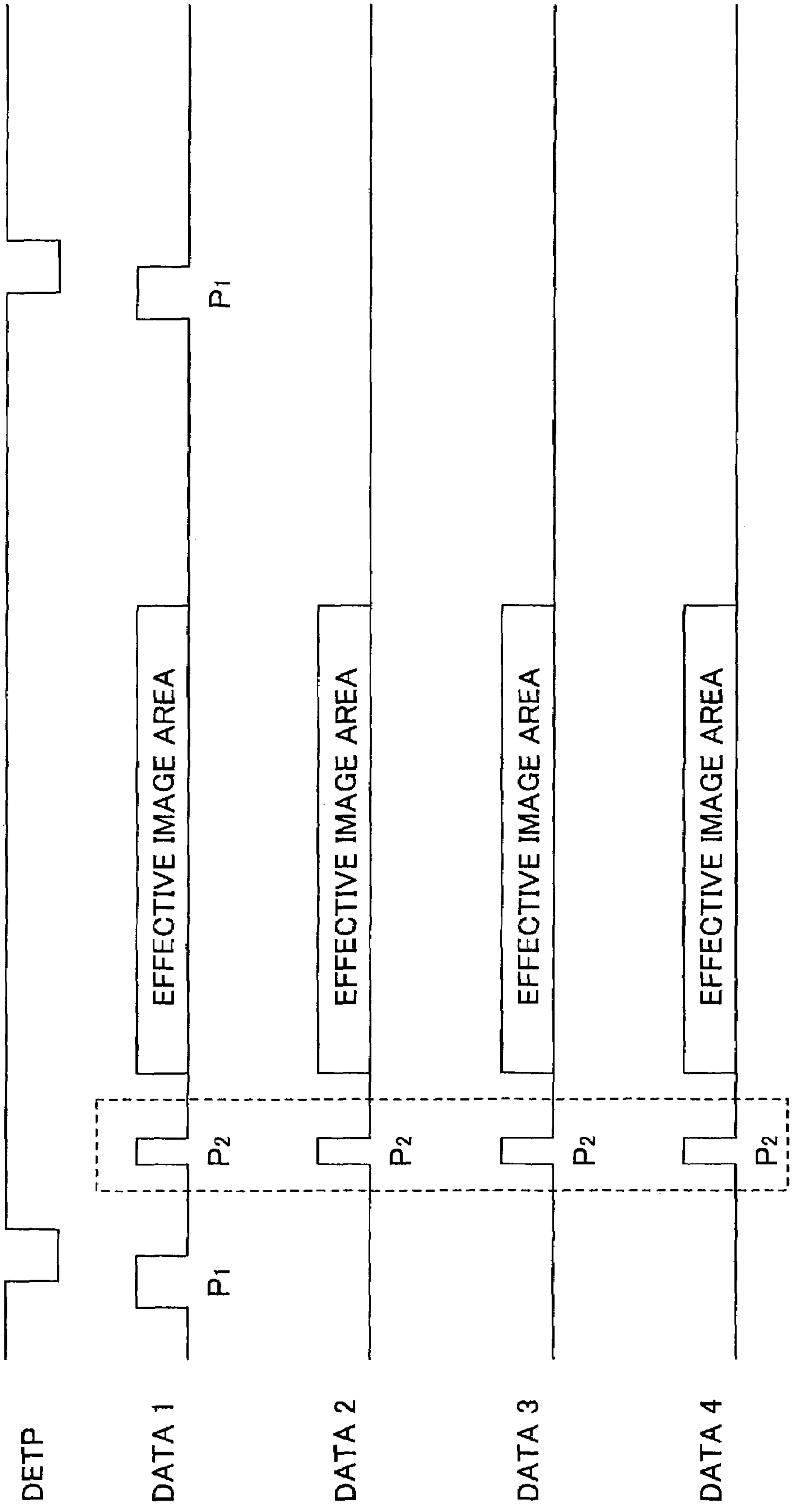
FIG. 10 is a timing chart showing the timing relation of signals when measuring the intervals in the image recording apparatus according to the first embodiment of the present invention.

FIG. 10 is a timing chart showing the timing relation of signals when measuring the intervals X1, X2, and X3.

As described above, the synchronization detection sensor 10 detects the laser beam from the laser diode LD1 driven by the pulse P1, and outputs the synchronization detection signal DETP. As illustrated in FIG. 10, after the detection of the synchronization detection sensor 10, the laser diodes LD1 through LD4 are driven by the pulse P2 to emit laser beams on the CCD area sensor 12 simultaneously.

Figure 11:
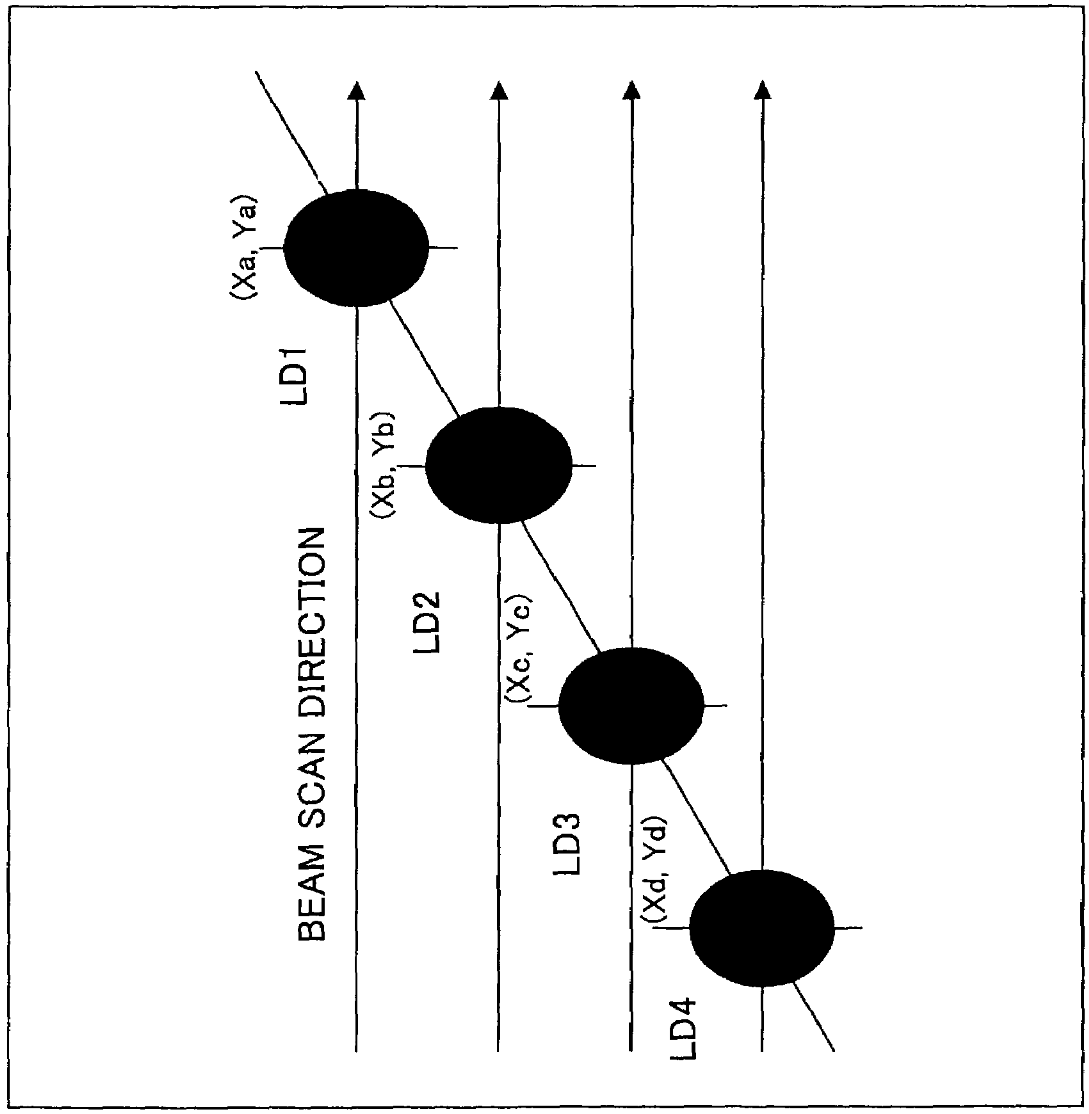
FIG. 11 is a view showing the CCD area sensor 12 irradiated by the laser beams.

FIG. 11 shows the active surface of the CCD area sensor 12 irradiated by the laser beams from the laser diodes LD1 through LD4 driven by the pulse P2.

As shown in FIG. 11, the CCD area sensor 12 is irradiated by the laser beams from the laser diodes LD1 through LD4 driven by the pulse P2, and the output signals from the CCD area sensor 12 are input to the CCD processing unit 22 (shown in FIG. 5). In the CCD processing unit 22, coordinates of centers of the laser beams from the laser diodes LD1 through LD4 are calculated ((Xa, Ya), (Xb, Yb), (Xc, Yc), (Xd, Yd)). From the coordinates of the beam centers, the CPU 23 calculates their intervals in the main scan direction, that is, X1, X2, and X3 shown in FIG. 4. Further, from these calculated intervals, the CPU 23 determines the light emission delays of LD2 through LD4 relative to LD1 to eliminate the fluctuation of intervals of laser beams from the laser diodes LD1 through LD4. According to thus determined light emission delays, the write clocks WCLKa, WCLKb, WCLKc, and WCLKd of appropriate time delays are selected from the write clocks WCLK1 through WCLK7 to control write operation of the corresponding laser beams.

Second Embodiment

Figure 12:
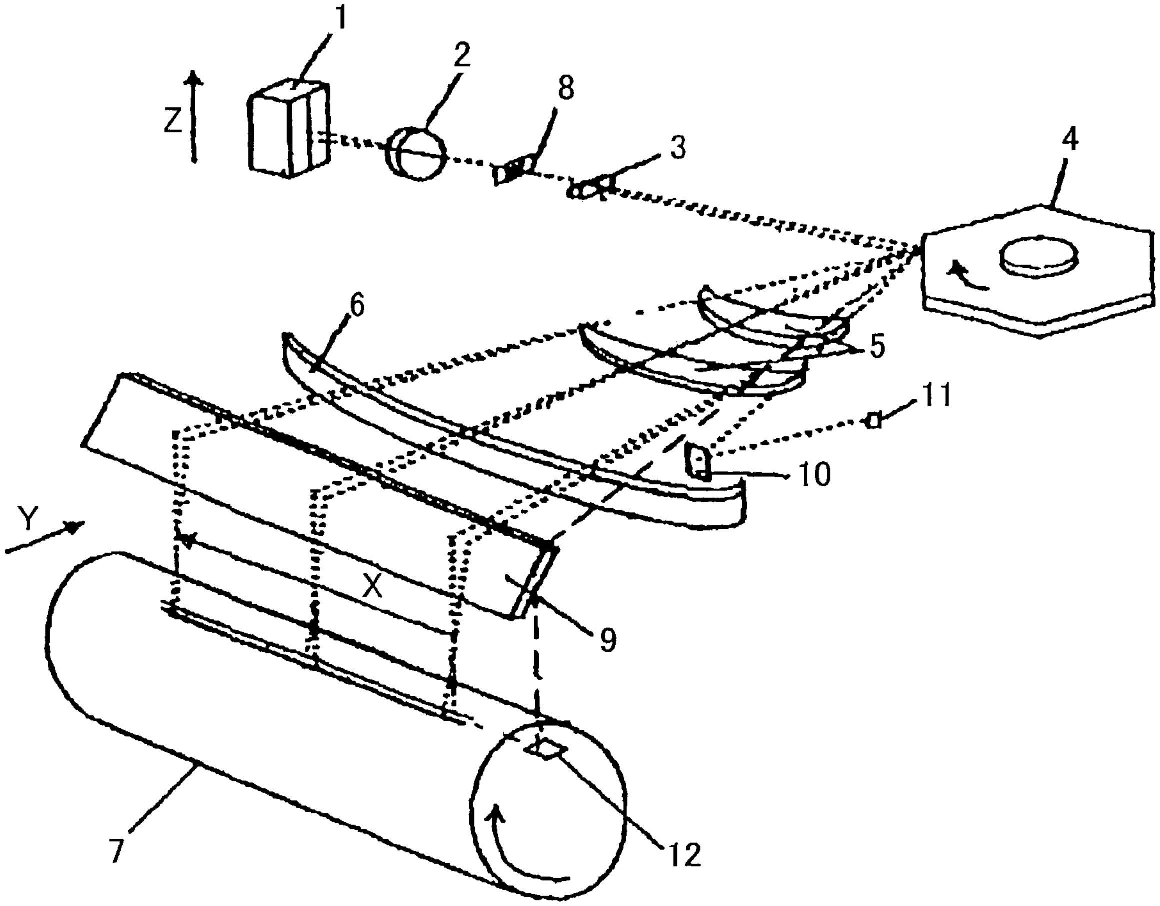
FIG. 12 is a perspective view showing a configuration of an image recording apparatus according to a second embodiment of the present invention.

FIG. 12 is a perspective view showing a configuration of an image recording apparatus according to a second embodiment of the present invention. The configuration of the present embodiment is basically the same as that in the first embodiment. Below only the differences between then are described. Further, in the following description, the same reference numerals are used for the same components as in the first embodiment.

As illustrated in FIG. 12, the CCD area sensor 12 is arranged near the photoconductor drum 7 along the main scanning direction at a position before the starting scanning position.

The same as in the first embodiment, at the timing shown by the timing chart in FIG. 10, first the laser diodes LD1 through LD4 are driven to emit light on the CCD area sensor 12 simultaneously to calculate the image dot intervals in the main scan direction (X1, X2, X3), and from these calculated intervals, the light emission delays of LD2 through LD4 relative to LD1 are determined.

Third Embodiment

Figure 13:
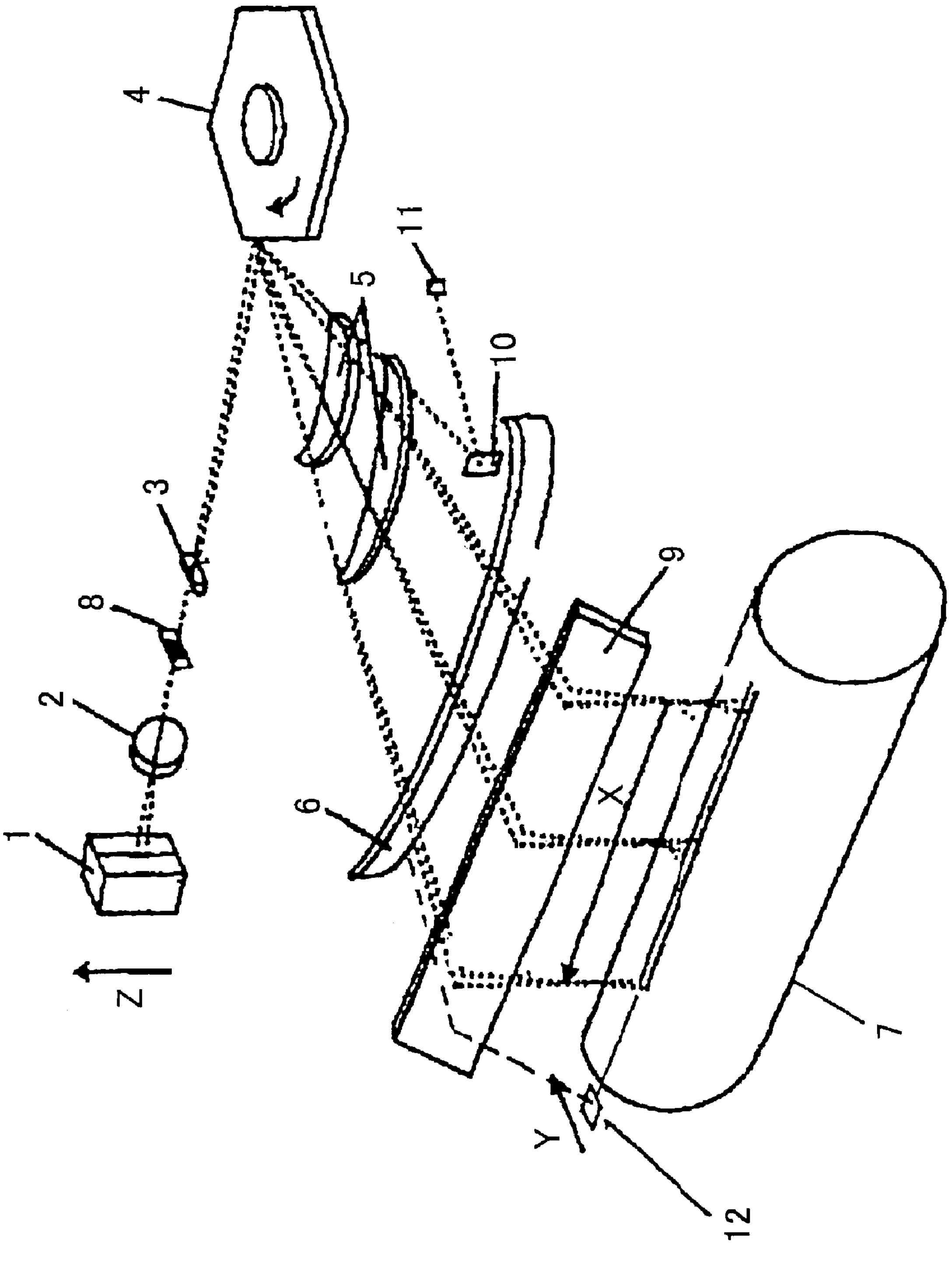
FIG. 13 is a perspective view showing the machinery portion of an image recording apparatus according to a third embodiment of the present invention.

FIG. 13 is a perspective view showing a configuration of an image recording apparatus according to a third embodiment of the present invention. The configuration of the present embodiment is basically the same as those in the previous embodiments. Below the differences between then are described. Further, in the following description, the same reference numerals are used for the same components as in the previous embodiments.

As illustrated in FIG. 13, the CCD area sensor 12 is arranged near the photoconductor drum 7 along the main scanning line at a position after the ending scanning position.

The same as in the previous embodiments, at the timing shown by the timing chart in FIG. 10, the laser diodes LD1 through LD4 are driven to emit light on the CCD area sensor 12 simultaneously to calculate the image dot intervals in the main scan direction (X1, X2, X3), and from these calculated intervals, the light emission delays of LD2 through LD4 relative to LD1 are determined.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, according to the present invention, a detection unit is provided to measure the intervals of image dots formed by a plurality of light emitting units, and from the measured intervals, the light emission time of the light emitting units are adjusted to eliminate the fluctuation of timing intervals of the image dots in the main scan direction during scanning. As a result, it is possible to realize an image recording apparatus that forms images without fluctuation of image dot intervals in the main scan direction. In addition, the adjustment procedure in fabrication of the image recording apparatus can be omitted. Furthermore, such interval fluctuation does not occur even after changing the laser driving unit.

In addition, when arranging the detection unit near the photoconductor along the main scanning direction at a position before the starting scanning position, it is possible to correct the image dot intervals in the main scan direction on the scanning surface, enabling formation of images without fluctuation of image dot intervals in the main scan direction.

In addition, when arranging the detection unit near the photoconductor along the main scanning direction at a position after the ending scanning position, it is possible to correct fluctuation of the image dot intervals in the main scan direction caused by jitter of the polygon motor, and by the accumulated jitter of the PLL that generates the write clocks, enabling formation of images without fluctuation of image dot intervals in the main scan direction.

This patent application is based on Japanese priority patent application No. 2002-176152 filed on Jun. 17, 2002, the entire contents of which are hereby incorporated by reference.

What is claimed is:

1. An image recording apparatus, comprising:

a light emitting source including a plurality of light emitting units that emit a plurality of laser beams, the light emitting units being arranged at predetermined intervals;

a rotating deflector that, while rotating, deflects the plurality of laser beams to scan in a main scan direction;

a photoconductor having a scanning surface irradiated by the laser beams deflected by the rotating deflector, each laser beam forming an image dot on the scanning surface; and a detection unit arranged to detect the laser beams and measure intervals of the laser beams in the main scan direction, each of the intervals being a distance between an image dot formed on the scanning surface by one laser beam and another image dot formed on the scanning surface by another laser beam;

wherein light emission timings of the light emitting units are adjusted in response to the measured intervals to compensate for interval differences of the light emitting units.

2. The image recording apparatus as claimed in claim 1, wherein the detection unit is arranged between the rotating deflector and the photoconductor.

3. The image recording apparatus as claimed in claim 1, wherein the detection unit is arranged to be adjacent to the photoconductor along the main scan direction.

4. The image recording apparatus as claimed in claim 1, further comprising:

a write clock generation unit configured to generate a plurality of write clocks of different phases;

a selection unit configured to select a number of the write clocks according to the measured intervals; and a laser driving unit configured to drive the light emitting units based on the selected write clocks.

5. The image recording apparatus as claimed in claim 1, wherein the detection unit is configured to receive the laser beams from the light emitting units simultaneously.

* * * * *